Patented June 21, 1949

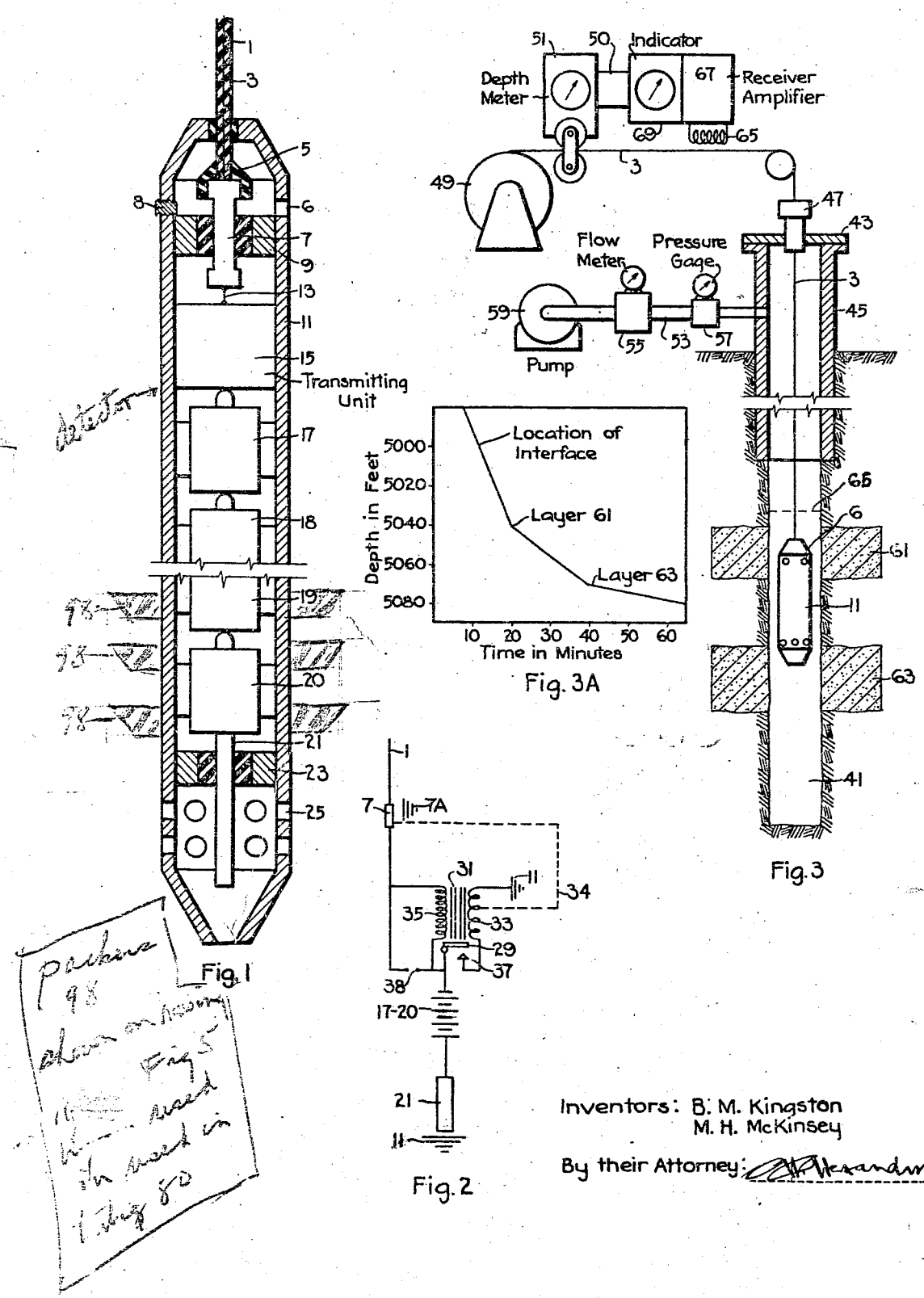

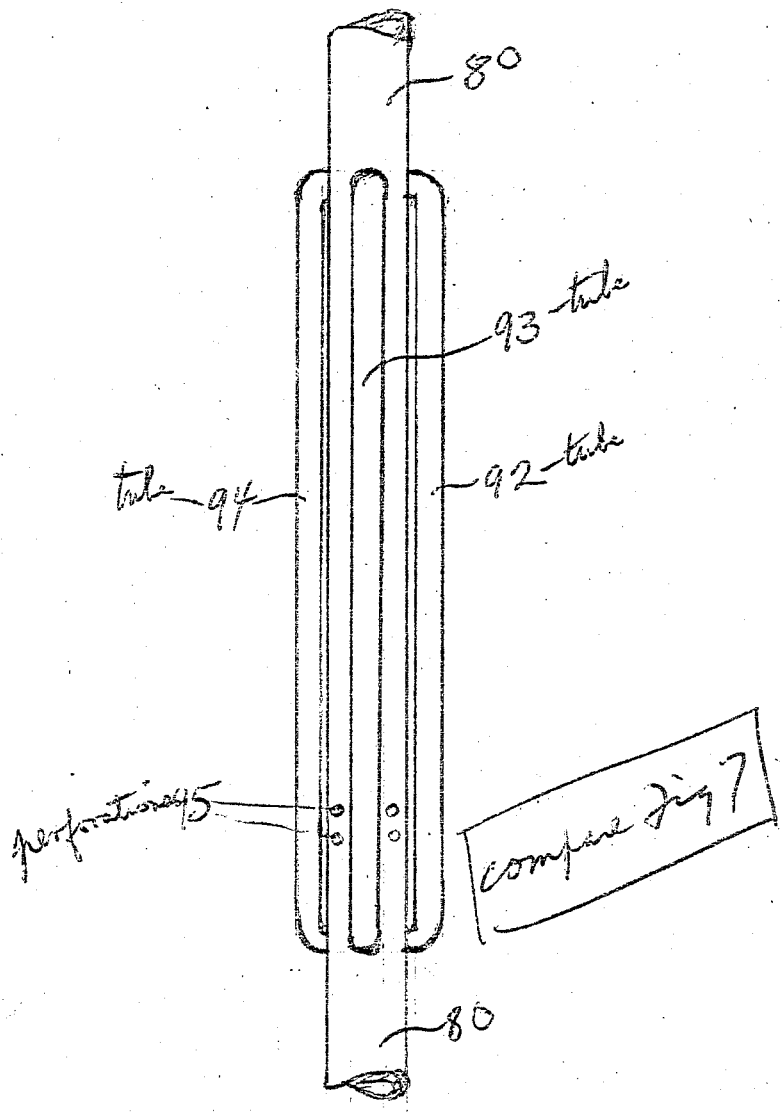

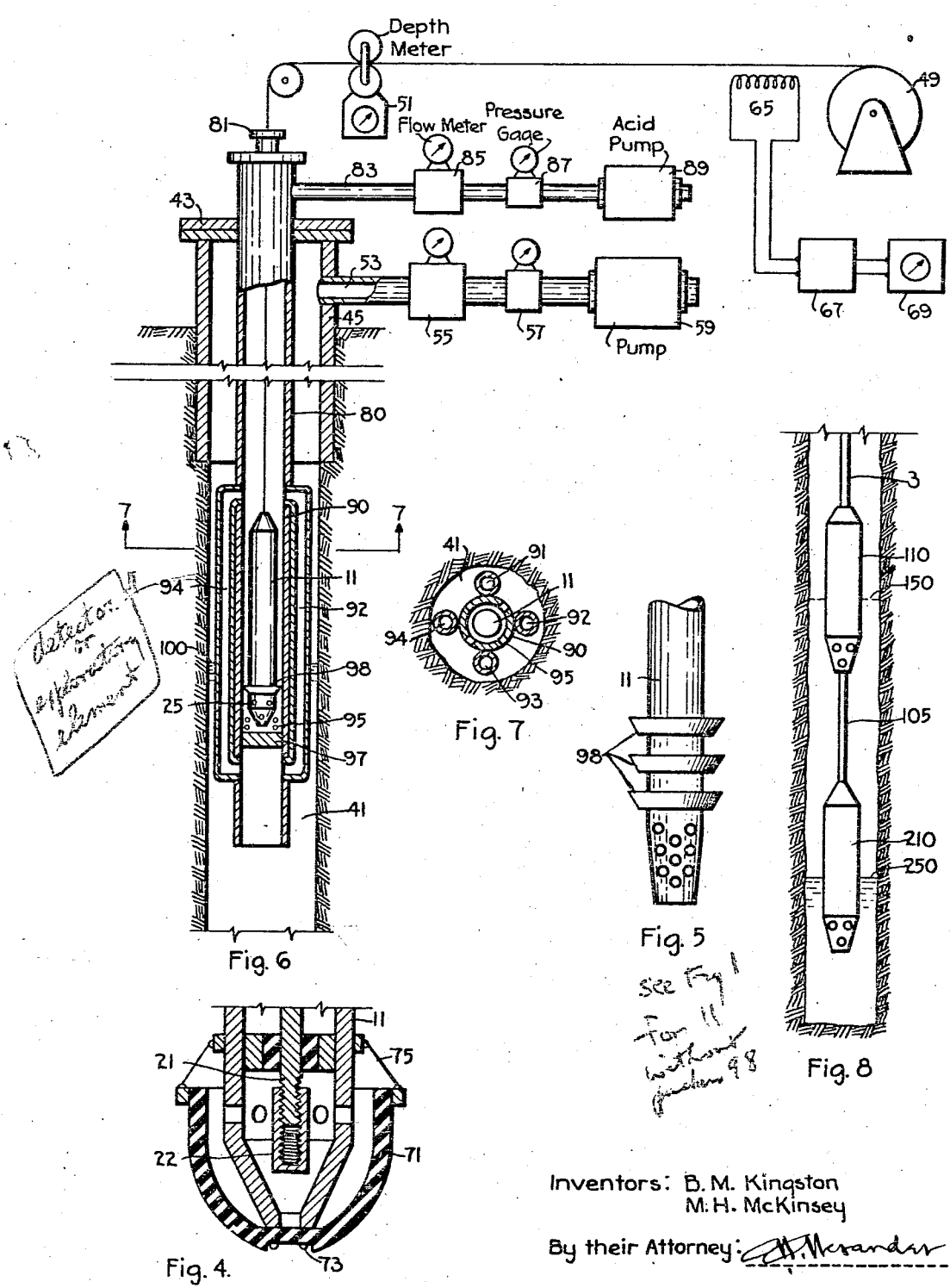

2,473,713

UNITED STATES PATENT OFFICE 2,473,713

WELL FLUID MEASUREMENT

Benson M. Kingston, Breckenridge, and Mark H. McKinsey, Midland, Tex., assignors, by direct and mesne assignments, of one-half to Shell Development Company, San Francisco, Calif., a corporation of Delaware, and one-half to The Independent-Eastern Torpedo Company, Breckenridge, Tex., a corporation of Ohio Application May 20, 1946, Serial No. 671,044

5 Claims. (Cl. 73—151)

This invention pertains to a system for determining or measuring the characteristics of well fluids, and relates more particularly to a system for making liquid flow and level measurements in oil and gas wells.

In exploiting and treating petroleum wells it is essential to obtain accurate information as to the nature of the fluids standing therein, the points where fluids may enter or leave the borehole, the flow rates of the well fluids, the levels of interfacial planes between different well fluids, the permeabilities of various layers traversed by a well, etc.

In making these measurements, use has been often made of differences in the electric conductivity of electrolytic liquids, such as acids or brines, and of non-electrolytic liquids, such as mineral oil. By immersing two spaced electrodes in a well fluid, and passing an electric current therebetween, the nature of the fluid surrounding the electrodes can be readily determined from the resistance of said fluid to electric current flow. In particular, the interface between an electrolyte and a non-electrolyte may be located by observing the abrupt change of current in the circuit of the electrodes when the electrodes pass from an electrolytic to a non-electrolytic phase.

Certain difficulties are however encountered in supplying the electrodes with suitable current, and in conveying to the indicating or recording instruments at the surface the desired indications or signals from the electrodes.

Thus, supplying the electrodes with a direct or alternating current from the surface requires a well insulated conductor cable and a relatively elaborate system of commutator connections between the conductor on the reel and the indicating or recording apparatus. Leakage effects occurring when passing low tension signals through a long cable tend furthermore to detract from the accuracy of the measurements.

If the electrodes are supplied with current from a source such as a dry cell battery lowered into the well together with the electrodes, the resulting direct current intensities and signals are necessarily very weak, and are subject to further cable leakage losses. Direct current signals are moreover not readily subject to amplification prior to registering or recording.

It is therefore an object of this invention to provide a system whereby fluid conditions in a well may be determined by means of electrodes adapted to be lowered thereinto together with a source of direct current and with means for causing the direct current flowing between said electrodes upon immersion in an electrolyte to produce a high tension alternating or oscillating current, said means comprising, for example, an electronic oscillator circuit or a spark coil arrangement, as described hereinbelow with regard to a preferred embodiment of the present invention.

It is also an object of this invention to provide for the above purpose a system wherein signals from the detecting electrodes are transmitted to the surface as electromagnetic waves produced by the interruptions of the current flowing between the electrodes.

It is also an object of this invention to provide for said purpose a system wherein electromagnetic wave signals from the electrodes are transmitted to the surface by means of the cable supporting the electrodes and serving as a radiating or transmitting antenna, said signals being inductively picked up by the receiving and indicating apparatus at the surface, thus eliminating the necessity of commutators or other direct electrical connections between the cable and the indicating apparatus.

It is in general an object of this invention to provide a system for determining the nature, level and flow rate of well fluids, for surveying the permeability of the strata traversed by a well, and for detecting the points of entry of extraneous liquids into a well.

It is a particular object of this invention to provide an apparatus of the type outlined above, to be used in combination with suitably formed tubing members, likewise forming a part of this invention, for determining and indicating at the surface the exact level of an acid charge introduced into a well for treatment purposes, whereby the process of introducing said acid into the well and of forcing it into the surrounding formations can be accurately controlled.

These and other objects of this invention, as described hereinbelow and specifically defined in the claims, will be understood from the following description taken with reference to the attached drawings, wherein:

Fig. 1 is a diagrammatic cross-section view of an embodiment of the present electrode-carrying detector.

Fig. 2 is a diagram of the electric circuit of the present detector.

Fig. 3 is a diagram of the well installations of the present system.

Fig. 3A is a chart showing data obtained and plotted by means of the present system.

Figs. 4 and 5 are diagrams of the lower end of the present detector modified by external attachments thereto.

Fig. 6 is a diagram of well installations used in acid treating a well by means of a preferred embodiment of the present system.

Fig. 7 is a diagrammatic cross-section view taken along line 7—7 of Fig. 6.

Fig. 8 illustrates an alternative of constructing and using the device of the present invention.

Referring to Fig. 1, the detector or exploratory element of the present invention comprises a metallic housing 11 firmly clamped by any desired means, such as shown at 5, to a supporting insulating cable 3 on which the housing is lowered into the well. The housing 11 may have a length such as from 3 to 5 feet or more, and a diameter such as from 1 to 2 inches or more. The cable 3 comprises an insulated conductor 1 electrically connected within the housing to a connector member 7 passing through a fluid tight insulating upper bushing 9. The member 7 is in turn electrically connected to a terminal of a transmitting or oscillatory circuit held in a compartment 15.

The operating current for the transmitting circuit is supplied by connecting thereto one of the terminals of a battery which may comprise, for example, a series arrangement of dry cells shown at 17-20 inclusive. The other terminal of the dry cell battery is connected to an electrode 21, passing through an insulating fluid-tight lower bushing 23. The space below bushing 23 is open to the well fluid in which the electrode 21 is immersed.

The electrical circuit of the elements forming an embodiment of the transmitter 15 is shown in Fig. 2. As stated above, one of the terminals of the battery 17-20 is connected to the electrode 21, while the other terminal is connected to a vibrator 29 of a spark coil arrangement held in compartment 15. The vibrator 29 is actuated, in well known fashion, by an induction coil comprising a core 31, a low-tension primary winding 33 and a high-tension secondary winding 35.

One of the terminals of the primary winding 33 is connected to a contact point 37 associated with the vibrator 29. The other terminal of the primary winding is grounded to the housing 11 of the detector. It will thus be seen that the electrode 21 and housing 11 form two electrodes connected to the circuit of the battery 17-20 and separated from each other by the liquid entering the lower part of the housing through the openings 25.

The secondary winding 35 and the spark gap 38 connected across it form a sending circuit connected to the conductor 1 of the supporting cable 3, which serves as a transmitting antenna.

Although the physical and electrical constants of the spark gap circuit may be varied between wide limits to suit particular operating conditions, the following may be used as an illustrative example:

The current supply source may consist of six dry-cells of 1.5 volts each. The primary winding may consist of about 700 turns of No. 26, and the secondary winding of about 8000 turns of No. 33 B. and S. gage copper wire.

Fig. 3 shows the housing 11 lowered into a well 41 through the removable head 43 of a casing 45 extending into the well to a desired depth. The cable 3 passes through a lubricator device 47 and is wound on a reel 49. A depth meter 51 indicates the exact level of the housing 11 within the well.

A pipe 53, provided with a flow meter 55 and a pressure gage 57, connects the casing to a pump 59, whereby liquid of any desired type may be pumped into the well.

The well is shown as traversing layers 61 and 63, which may be layers of different permeability and porosity characteristics, or water and oil bearing layers.

In using the system of the present invention for purposes of a permeability survey, such as are often carried out before acidizing wells, the borehole 41 is first filled with an electrolytic liquid, such as brine, to a desired level 66 preferably above the top permeable zone 61. The well space above the electrolyte is then filled with a non-electrolytic liquid, such as oil, and the housing or sending device 11 is lowered until it contacts the electrolyte.

It will be seen from Figs. 1 and 2 that as long as the present detector is immersed in oil, no current flows in its electrical circuit, the electrode 21 being insulated from the housing 11. Upon reaching the level 66, however, the electrolytic liquid fills the space between the electrode 21 and the walls of housing 11, thus permitting a current to flow in the circuit of the primary winding 33. The action of the vibrator 29 serves, in well known fashion, to interrupt periodically this direct current, thus producing a high tension interrupted or alternating current in the circuit of the secondary winding 35. The points of the spark gap 38 are adjusted so that when the voltage in the secondary circuit reaches or approaches its peak, a spark discharge takes place therebetween. This spark discharge causes the conductor 1 of cable 3, to radiate an electromagnetic wave, thereby serving as a sending or transmitting antenna.

This electromagnetic radiation is picked up by a receiving antenna 65, inductively coupled to the cable 3 at the surface, and is relayed, if desired after suitable amplification in unit 67, to an indicating device 69, which may be of any desired type, such for example as an auditory device, a recorder, etc.

As the detector reaches the interface 66, and contact of the electrode 21 with the electrolyte is indicated by the response of the device 69, the pump 59 is started to supply further amounts of oil to the well 41, thereby further depressing the interface 66.

The cable 3 is at the same time unwound from the reel 49 to follow the receding interface with the detector. It will be seen that the construction of the present detector permits it to follow the interface with great accuracy.

Thus if the rate of descent of the detector is slower than that of the interface, the detector finds itself again immersed solely in the oil phase, no current passes through the liquid between the electrode 21 and the housing 11, no electrical oscillations are transmitted through cable 3, and the operator is informed of this condition by the lack of response of the indicator 69.

If the rate of descent of the detector is faster than that of the interface, the detector finds itself immersed solely in the electrolytic phase.

In this case, the electrolyte, entering the upper portion of the housing through openings 6, causes a short circuit between the connector 7 and the housing 11, as indicated at 7A in Fig. 2. The electromagnetic oscillations transmitted through the cable to the indicator 69 are therefore extremely attenuated, and the operator can correct this condition by unwinding of the reel 49 at a slower rate.

If desired, a shunt connection 34 may be used to connect a point intermediate the terminals of the primary 33 to the grounded connector 7A, whereby only a portion of the signal becomes attenuated when the instrument is completely submerged in an electrolyte, and the operator obtains a more positive control by observing the difference in the output signal.

Thus, the present device is capable of indicating the exact location of the interface with an accuracy dependent on the spacing between electrode 21 and connector 7, that is within approximately 3 feet.

An arrangement alternative to that described above, and used for the same purpose, is illustrated in Fig. 8.

Detector elements 110 and 210 similar in construction and operation to that described in Fig. 1, are axially connected to each other by means of a spacing element 105, having any desired length and consisting, for example, of an insulated conductor cable or of a rigid tubular element enclosing such cable to establish electrical communication between the two elements.

It will be readily seen that so long as the electrolyte rises to a level such as 250, only the lower detector unit will emit a signal. When, however, the electrolyte level rises to 150, the upper detector unit will likewise start operating, thus adding its signal to that of the lower unit, and varying the intensity, or the frequency, or both, of the signal received at the surface.

The pump 49 is operated in such a manner as to establish a constant or fixed pumping rate. As the interface is depressed, its rate of descent decreases as it passes each consecutive permeable zone, such as zones 61 and 63, said rate of descent being a function of the permeability of said zones.

By coordinating the indications of the depth meter 51 with those of the indicator 69, which can be done either manually or automatically by electrically connecting said instruments, for example, by means of wires 50, the rate of fall of the interface may be plotted graphically, as shown in Fig. 3A, which gives the operator a useful picture of permeability conditions relating to the well.

In a similar way, the present device may be used to determine the point of entry of an extraneous fluid, such as brine, into the well.

Thus, assuming that it is not known whether brine enters the well from layer 61 or from layer 63, the well is filled with oil by means of pump 59, and the present device is thereafter moved through the well, the exact point of entry of the brine being determined by coordinating the indications of the depth-meter 51 and indicator 69. In such cases, the openings 6 in the upper portion of the housing 11 should be closed by means such as plugs 8 shown in Fig. 1. Likewise, it may sometimes be desirable to provide the housing 11 with an annular member such as a bucket 71, attached to the lower portion of the housing 11 in any suitable manner, as shown at 73 and 75 in Fig. 4. The bucket 71 is preferably made of a material such as rubber or rubberized canvas, and has a diameter closely fitting the walls of the borehole. When the device 11 is moved adjacent a salt water bearing layer, the scooping action of the bucket results in filling the space around the electrode 11 with brine, whereby a distinctive signal is transmitted to the surface.

Fig. 6 shows the preferred application of the device hereinabove described in combination with a special tubing arrangement likewise forming an important part of the present invention. The apparatus of Fig. 6 is used to control the introduction of a treating acid into a well.

The well 41 is shown in Fig. 6 as containing a tubing string 80, passing through the casing head 43 and provided with a lubricator 81 for the cable supporting the detector. The tubing 80 is in communication at the surface with a pipe 83, having a flow meter 85 and a pressure gage 87, whereby acid may be supplied to the tubing 80 from a pump 89. The rest of the elements forming the arrangement of Fig. 6 are identical with corresponding elements of Fig. 3 and are indicated by the same numerals.

The tubing string 80 has attached thereto at its lower end a seating nipple 90, having a lower closure member 97 and a plurality of perforations 95 just above said closure member. The perforations 95 are in communication between the space inside the nipple 90 and the space outside thereof opening to said outside space between the longitudinal tubes 91—94, as clearly shown in Fig. 7.

A plurality of small diameter tubular elements 91—94 are welded or otherwise attached to the seating nipple co-longitudinally and outwardly thereof, as shown more clearly in Fig. 7. These tubular elements form fluid passages in communication with the tubing string 80 and seating nipple 90 at points above and below the closure member 97.

The detector housing 11 is provided, for purposes of operation according to the system of Fig. 6, with a plurality of cup or packer members 98 shown in Fig. 5, adapted to fit tightly within the seating nipple 90 and to exclude acid from the lower perforated portion of said detector, as will be described hereinbelow.

In operating the system of Fig. 6 for well acidizing purposes, the well 41 is filled with oil from pump 59, and the tubing 80 is lowered into the well until the seating nipple 90 is at the level at which it is desired to keep the oil-acid interface. The device 11, with the openings 6 plugged, is positioned in the seating nipple just above the closure member 97.

Acid is then delivered to the tubing string from pump 89, passing around the closed seating nipple through tubes 91—94 and out into the well through the lower end of the tubing string. No response is obtained at this time from the detector, as the acid does not reach the electrode 21, being excluded therefrom by the seal packers 98.

When the heavier acid displaces the oil from the bottom of the well, and its rising level reaches the seating nipple 90, the acid passes inside the seating nipple through the openings 95, arranged between the tubes 91—94, and inside the housing through openings 25, thus establishing electrical contact between the electrode 21 and the housing 11, and producing a signal transmitted and indicated at the surface as described hereinabove. Additional oil may then be supplied from pump 59 in order not to permit the acid level to rise any higher, and to force any further amounts of acid which may be added from pump 89 into the lower formations to be treated.

From the above description it will be seen that the present system is capable of producing signals which may be picked up by means such as an ordinary radio receiver, thereby eliminating the necessity of reel commutators and other relatively complicated devices necessary for conductively connecting the cable conductor to the indicating devices at the surface. This system is also extremely effective in transmitting signals indicating the presence of an electrolyte in a well, since the intensity of the present electromagnetic signals is not affected to any appreciable degree by the use of long cables, whereas said long cables are known to be subject to leakage effects, whereby the intensity of ordinary low tension D. C. or A. C. signals is greatly reduced, and difficulties are experienced in effecting accurate determinations.

The present detector can be adjusted or calibrated to give a signal for any given salinity or electrolytic concentration of the well fluid. For example, as shown in Fig. 4, the surface area of the electrode 21 which is exposed to the electrolyte may be varied by providing said electrode with an extension sleeve member 22 in screw-threaded engagement with the electrode, whereby the effective area of contact of the electrode with the well fluid may be adjusted to a desired value. Furthermore, the indicating device 69 may be adjusted by suitable calibration to give indications quantitatively related to the values under measurement.

We claim as our invention:

1. In a system for determining the characteristics of a fluid in a well, the combination of an insulated conductor cable, a detector housing adapted to be lowered into a well attached to the lower end of said cable, two electrodes insulated from each other carried by said housing in contact with the well fluid, means comprising a source of current in said housing having its terminals connected to said electrodes for passing a direct current between said electrodes through the fluid surrounding said electrodes, means in said housing electrically connected to the conductor cable for converting said direct current into electrical oscillations, indicator means inductively coupled with the upper end of the cable at the surface for indicating said oscillations, and depth meter means at the surface for measuring the depth of said housing in correlation with the indicated oscillations.

2. In a system for determining the characteristics of a fluid in a well, the combination of an insulated conductor cable, a detector housing adapted to be lowered into a well attached to the lower end of said cable, two electrodes insulated from each other carried by said housing in contact with the well fluid, primary circuit means comprising a source of current in said housing having its terminals connected to said electrodes for passing a direct current between said electrodes through the fluid surrounding said electrodes, secondary circuit means inductively coupled to the first circuit means and electrically connected to the conductor cable, means for producing high-tension electrical oscillations in the secondary circuit means, said means comprising an interrupter in the primary circuit means said primary and secondary circuit means being contained within said housing, indicator means inductively coupled with the upper end of the cable at the surface for indicating said high-tension oscillations, and depth meter means at the surface for measuring the depth of said housing in correlation with the indicated oscillations.

3. In a system for determining the characteristics of a fluid in a well, the combination of an insulated conductor cable, an elongated detector housing adapted to be lowered into a well attached to the lower end of said cable, an electrode carried by the lower portion of the housing and electrically insulated therefrom, a first circuit comprising a source of direct current in the housing having one terminal connected to the housing and one terminal connected to said electrode, whereby a current is caused to flow in said circuit when the lower portion of the housing and electrode are immersed in a conductive well fluid, a second circuit inductively coupled to the first circuit, means comprising an interrupter in the first circuit for producing high-tension electrical oscillations in the second circuit said first and second circuit being contained in said housing, a connector between the second circuit and the conductor cable carried by the upper portion of the housing and electrically insulated therefrom, said connector being exposed to the well fluid, whereby said second circuit is short circuited when the upper portion of the housing is immersed in a conductive well fluid, indicator means inductively coupled to the upper end of the cable for indicating the high-tension oscillations passing to the cable from the second circuit, and depth meter means at the surface for measuring the depth of said housing in correlation with the indicated oscillations.

4. In a system for determining the characteristics of a fluid in a well, the combination of an insulated conductor cable, a detector unit adapted to be lowered into a well attached to the lower end of said cable, said unit comprising a first elongated housing forming a first electrode, a second electrode carried by said housing and electrically insulated therefrom, means comprising a source of current in said housing having its terminals in circuit with said electrodes for passing a current therebetween when said electrodes are immersed in an electrolytic fluid, means in said housing electrically connected to the conductor cable for converting said direct current into electrical oscillations, a second elongated housing axially spaced from said first housing, said second housing forming a third electrode, a fourth electrode carried by said second housing and electrically insulated therefrom, means comprising a source of current in said second housing having its terminals in circuit with the third and fourth electrodes for passing a current therebetween when said electrodes are immersed in an electrolytic fluid, means in said second housing electrically connected to the conductor cable for converting the direct current passing between the third and fourth electrodes into electrical oscillations, the oscillations travelling in the cable from each of said detectors reacting with each other to modify the character of the signal arriving to the surface, indicator means inductively coupled with the upper end of the cable at the surface for indicating said signal and depth meter means at the surface for measuring the depth of said detector unit in correlation with the indicated oscillations.

5. In a system for measuring the level of an electrically conductive fluid in a well, the combination of a tubing string extending into the well, a tubular seating member attached to the lower end of said string, a transverse closing element in said seating member, fluid passage means extending co-longitudinally with and outwardly of said seating member in communication therewith above and below said closing element, perforations through the walls of said seating member above said closing element in communication between the space inside said seating member and the space outside said seating member and said fluid passage means, a detector housing adapted to be positioned within said seating member with its lower end adjacent said closing member and its upper end below the upper end of said fluid passage means, a packer member outwardly carried by said housing adapted to seal the annular space between the housing and the walls of the seating member above the perforations therethrough when said housing is positioned in said seating member, two electrodes insulated from each other carried by said housing, said electrodes being exposed to the fluid within said seating member below said packer when said housing is positioned in said seating member, means comprising a source of current in said housing having its terminals connected to said electrodes for passing a direct current between said electrodes and the fluid surrounding said electrodes, means for converting said current into electrical oscillations, an insulated conductor cable extending to the surface and having its lower end attached to said housing for lowering the housing into the tubing string, said cable being electrically connected to said converting means, indicator means inductively coupled to the upper end of the cable for indicating oscillations transmitted to said cable by said converting means, and depth meter means at the surface for measuring the depth of said housing in correlation with the indicated oscillations.

BENSON M. KINGSTON.
MARK H. McKINSEY.

REFERENCES CITED

The following references are of record in the file of this patent:

UNITED STATES PATENTS

| Number | Name | Date |
|---|---|---|
| 2,283,429 | Ennis | May 19, 1942 |
| 2,347,615 | Shelley | Apr. 25, 1944 |
| 2,421,423 | Krasnow | June 3, 1947 |